United States Patent
Eisele et al.

(10) Patent No.: US 10,414,240 B2
(45) Date of Patent: Sep. 17, 2019

(54) METHOD AND AIR-CONDITIONING SYSTEM FOR AIR-CONDITIONING AN ELECTRIC OR HYBRID VEHICLE

(71) Applicant: Bayerische Motoren Werke Aktiengesellschaft, Munich (DE)

(72) Inventors: Marc-Thomas Eisele, Munich (DE); Christian Kulp, Munich (DE); Nicolas Flahaut, Munich (DE); Karsten Berg, Starnberg (DE); Martin Knott, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/625,677

(22) Filed: Jun. 16, 2017

(65) Prior Publication Data

US 2017/0282677 A1    Oct. 5, 2017

Related U.S. Application Data

(63) Continuation of application No. PCT/EP2015/079280, filed on Dec. 10, 2015.

(30) Foreign Application Priority Data

Dec. 19, 2014    (DE) .................. 10 2014 226 514

(51) Int. Cl.
*F25B 29/00*    (2006.01)
*B60H 1/00*    (2006.01)
(Continued)

(52) U.S. Cl.
CPC ..... *B60H 1/00278* (2013.01); *B60H 1/00385* (2013.01); *B60H 1/00764* (2013.01);
(Continued)

(58) Field of Classification Search
CPC ........ B60L 1/02; B60L 2240/34; B60L 1/003; B60L 11/1874; B60H 1/00278;
(Continued)

(56) References Cited

U.S. PATENT DOCUMENTS

| | | | |
|---|---|---|---|
| 5,937,664 A * | 8/1999 | Matsuno | B60H 1/00278 62/186 |
| 2009/0249802 A1 | 10/2009 | Nemesh et al. | |

(Continued)

FOREIGN PATENT DOCUMENTS

| | | |
|---|---|---|
| CN | 101410261 A | 4/2009 |
| DE | 10 2005 023 365 A1 | 11/2006 |

(Continued)

OTHER PUBLICATIONS

German-language Search Report issued in counterpart German Application No. 10 2014 226 514.2 dated Aug. 10, 2015 with partial English translation (10 pages).

(Continued)

*Primary Examiner* — David D Hwu
(74) *Attorney, Agent, or Firm* — Crowell & Moring LLP

(57) ABSTRACT

A method for air conditioning an electric or hybrid vehicle includes preconditioning a high voltage accumulator of the electric or hybrid vehicle. The electric or hybrid vehicle has an interior and the high voltage accumulator is air conditioned with an air-conditioning unit having a determined cooling potential. The high voltage accumulator has a current HVS temperature. The interior has a current interior temperature. During the preconditioning, the high voltage accumulator is supercooled in a preconditioning mode with the air-conditioning unit to an HVS temperature that is below an HVS operating temperature.

15 Claims, 1 Drawing Sheet

(51) Int. Cl.
  *B60H 1/32* (2006.01)
  *B60L 1/00* (2006.01)
  *B60L 1/02* (2006.01)
  *B60L 58/26* (2019.01)

(52) U.S. Cl.
  CPC ....... *B60H 1/00892* (2013.01); *B60H 1/3211* (2013.01); *B60L 1/003* (2013.01); *B60L 1/02* (2013.01); *B60L 58/26* (2019.02); *B60L 2240/34* (2013.01); *B60L 2240/36* (2013.01); *B60L 2240/545* (2013.01); *B60L 2240/62* (2013.01); *Y02T 10/7005* (2013.01); *Y02T 10/705* (2013.01); *Y10S 903/907* (2013.01)

(58) Field of Classification Search
  CPC ............ B60H 1/00385; B60H 1/00764; B60H 1/00892; B60H 1/3211; Y02T 10/705; Y02T 903/907
  USPC ........................................................ 165/266
  See application file for complete search history.

(56) References Cited

U.S. PATENT DOCUMENTS

| | | |
|---|---|---|
| 2010/0241308 A1 | 9/2010 | Kikuchi et al. |
| 2012/0222438 A1 | 9/2012 | Osaka et al. |
| 2013/0166119 A1 | 6/2013 | Kummer et al. |
| 2014/0012445 A1 | 1/2014 | Fleckenstein et al. |
| 2014/0138042 A1* | 5/2014 | Yagi .......................... B60L 1/02 165/10 |
| 2014/0277869 A1 | 9/2014 | King et al. |

FOREIGN PATENT DOCUMENTS

| | | |
|---|---|---|
| DE | 10 2009 015 653 A1 | 11/2009 |
| DE | 10 2009 019 607 A1 | 11/2010 |
| DE | 10 2009 046 568 A1 | 5/2011 |
| DE | 10 2010 017 392 A1 | 12/2011 |
| DE | 10 2010 063 376 A1 | 6/2012 |
| DE | 10 2011 056 394 A1 | 6/2013 |
| KR | 10-2012-0130382 A | 12/2012 |

OTHER PUBLICATIONS

International Search Report (PCT/ISA/210) issued in PCT Application No. PCT/EP2015/079280 dated Mar. 21, 2016 with English translation (5 pages).

German-language Written Opinion (PCT/ISA/237) issued in PCT Application No. PCT/EP2015/079280 dated Mar. 21, 2016 (5 pages).

Chinese-language Office Action issued in counterpart Chinese Application No. 201580052614.7 dated Oct. 23, 2018 with English translation (16 pages).

* cited by examiner

METHOD AND AIR-CONDITIONING SYSTEM FOR AIR-CONDITIONING AN ELECTRIC OR HYBRID VEHICLE

CROSS REFERENCE TO RELATED APPLICATIONS

This application is a continuation of PCT International Application No. PCT/EP2015/079280, filed Dec. 10, 2015, which claims priority under 35 U.S.C. § 119 from German Patent Application No. 10 2014 226 514.2, filed Dec. 19, 2014, the entire disclosures of which are herein expressly incorporated by reference.

BACKGROUND AND SUMMARY OF THE INVENTION

Embodiments of the invention relate to a method and to an air-conditioning system for air-conditioning an electric or hybrid vehicle which has an interior and a high-voltage accumulator which can both be air-conditioned by means of an air-conditioning unit of the vehicle, which has a determined cooling potential, in which the high-voltage accumulator has a current HVS temperature ($H_{curr}$), and in which the interior has a current interior temperature ($I_{curr}$).

A conventional method for air-conditioning a vehicle is described, for example, in DE 10 2009 019607 A1.

For the drive of an electric or hybrid vehicle, such a vehicle comprises a drive train, with an energy accumulator for supplying energy. Said energy accumulator is typically an appropriately suitably dimensioned battery which is also referred to below as a high-voltage accumulator. The latter customarily heats up during charging or discharging operations, in which, if it heats up too greatly, there is the risk of in particular permanent power degradation or a reduction in the service life of the high-voltage accumulator. The latter is therefore customarily appropriately cooled during operation and, for this purpose, is frequently connected to an air-conditioning circuit of the vehicle, which is also used for air-conditioning the interior. Said air-conditioning circuit has a determined power, that is to say a determined maximum cooling potential, which can be used for cooling the interior and the high-voltage accumulator. Depending on the cooling requirement of the two components, there may be a conflict here in that the cooling potential does not suffice to serve the respective cooling requirement at the high-voltage accumulator and in the interior. In this case, depending on prioritization of the distribution of the cooling potential, either an increased thermal loading of the high-voltage accumulator or a loss of comfort in the interior may be anticipated.

In order to reduce the energy consumption for air-conditioning the interior in an electric or hybrid vehicle and in order to obtain an increased range of the vehicle by reducing the extraction of energy from the high-voltage accumulator, DE 10 2009 019 607 A1 describes a method for operating a vehicle. In this method, a device for air-conditioning a passenger compartment and an energy accumulator are thermally coupled to each other for the exchange of a cooling medium. It is thereby possible in certain situations first of all to interchange heat between the passenger compartment and the energy accumulator instead of activating the air-conditioning device. For example, thermal energy, in particular waste heat, of the energy accumulator is absorbed and output to the device for air-conditioning the passenger compartment. This occurs for as long as an actual temperature of the passenger compartment lies within a predetermined temperature range. In this manner, the energy accumulator is cooled without having to activate the air-conditioning device. The removed heat is output into the passenger compartment, but only for as long as the temperature of said passenger compartment lies within the predetermined temperature range.

One of the objects of the inventive method and system is to specify a method and an air-conditioning system for air-conditioning an electric or hybrid vehicle, in which both a loss of comfort in the interior of the vehicle and a possible power degradation of the high-voltage accumulator are avoided or at least reduced. The inventive method and system address the conflict in the distribution of the available cooling potential to be bypassed or the consequences thereof.

These and other objects are achieved by a method for air-conditioning an electric or hybrid vehicle with has an interior and a high-voltage accumulator which can both be air-conditioned by means of an air-conditioning unit of the vehicle, in which the air-conditioning unit has a determined cooling potential. In this case, the high-voltage accumulator has a current HVS temperature and the interior has a current interior temperature. In a preconditioning mode, the high-voltage accumulator is supercooled by means of the air-conditioning unit to an HVS temperature below an HVS operating temperature, for the preconditioning of the high-voltage accumulator.

An advantage obtained with the inventive method and system consists in particular in that the high-voltage accumulator is cooled by means of the air-conditioning unit although there is not specifically any cooling requirement in respect of the high-voltage accumulator and, as a result, the current HVS temperature assumes a value below the HVS operating temperature. The high-voltage accumulator is therefore advantageously supercooled below its HVS operating temperature. By means of this preconditioning, a cold buffer is then produced in an advantageous manner which delays the time of a possible cooling requirement at the high-voltage accumulator. Owing to the cold buffer, heating up of the high-voltage accumulator is then possible without power degradation due to the latter being heated up too strongly, without the air-conditioning unit having to be used for cooling the high-voltage accumulator. Said air-conditioning unit is then available, in particular exclusively, for cooling the interior with full cooling potential. The high-voltage accumulator thereby also forms a cold reservoir in respect of its own air-conditioning. The high-voltage accumulator is already preconditioned, in particular proactively, in those phases in which only a low cooling of the high-voltage accumulator, if any at all, would customarily take place.

Outside the preconditioning mode, the HVS temperature is in particular regulated to the HVS operating temperature which lies within a suitable HVS operating temperature range in order to avoid power degradation or damage. For example, the HVS operating temperature is between 20 and 40° C. By means of the regulation, the current HVS temperature is then kept at the predetermined HVS operating temperature. HVS operating temperature is understood here as meaning a fixedly predetermined temperature to which the high-voltage accumulator is regulated in a normal operating mode. The control unit therefore predetermines a defined, in particular fixed, temperature value as the HVS operating temperature, which temperature value lies, for example, within the range of 25 to 29° C. The interior temperature is likewise regulated to a temperature which is referred to below as the feel-good temperature. This temperature is predetermined in particular by the user of the vehicle and lies, for example, within the range of between 18 and 24° C. The current HVS temperature and the current interior temperature are regulated to the HVS operating temperature or the feel-good temperature in particular by means of air-conditioning by the air-conditioning unit.

In particular, when the HVS operating temperature or feel-good temperature is exceeded, the component concerned is cooled by means of the air-conditioning unit. The exceeding of the respective temperature corresponds here to a cooling requirement of the respective component which should be served by means of a determined cooling need. The maximum cooling need which can be satisfied is limited here by the cooling potential of the air-conditioning unit. In this connection, it is possible for the overall cooling need for the interior and the high-voltage accumulator to exceed the cooling potential of the air-conditioning system and therefore to bring about the cooling conflict described at the beginning in respect of the distribution of the cooling potential. It is conceivable here that the occurrence of this conflict can be delayed by appropriately greater dimensioning of the air-conditioning unit, but this solution is correspondingly cost-intensive and cannot be used in vehicles which already exist and in the existing air-conditioning systems thereof. A further advantage consists in particular in that the cooling conflict mentioned can be avoided or can be delayed in time even in air-conditioning systems which already exist.

In order, in the preconditioning mode, to ensure that the cooling potential is at least partially available for preconditioning the high-voltage accumulator, the preconditioning mode is preferably activated depending on a cooling requirement profile for the interior and in particular in addition also depending on a cooling requirement profile of the high-voltage accumulator. This cooling requirement profile describes the cooling need which is required for regulating the interior temperature to the feel-good temperature or for regulating the HVS temperature to the predetermined HVS operating temperature. If, for example, it is foreseen because of the cooling requirement profile that a particularly high cooling need will be present at a future time, the preconditioning mode is activated in order then subsequently to use the full cooling potential for air-conditioning the interior and at the same time to avoid the high-voltage accumulator heating up too strongly. In other words, the overall cooling need of the interior and of the high-voltage accumulator that probably will exceed the cooling potential at a future time is divided up in time in that the high-voltage accumulator is correspondingly preconditioned at an earlier time.

Additionally, in the preconditioning mode, the high-voltage accumulator is supercooled as long as the cooling potential is at most partially used for cooling the interior. In this case of at most partial use, the remaining cooling potential is then used proactively for preconditioning the high-voltage accumulator. This results in particularly efficient utilization of the entire available cooling potential of the air conditioning unit. In particular in combination with the activation of the preconditioning mode depending on the cooling requirement profile for the interior, the activation then takes place in particular if the cooling demand in the interior falls short of the cooling potential of the air-conditioning unit and unused cooling potential is correspondingly present.

In order in particular in the event of a future, for example unforeseen, interior cooling need, to avoid a possible future cooling conflict, a future HVS temperature may be predicted and the preconditioning mode is activated if said future HVS temperature exceeds a maximum HVS operating temperature. The maximum HVS operating temperature here marks a limit temperature, above which non-tolerable degradation effects may occur at the high-voltage accumulator. Exceeding of said temperature should therefore be avoided. In particular, the maximum HVS operating temperature corresponds to the upper limit of the HVS operating temperature range and, for example, to 40° C. The HVS operating temperature of the high-voltage accumulator, to which the temperature is regulated in the normal operating mode outside the preconditioning mode, then lies below the maximum HVS operating temperature. By means of the prediction of the future HVS temperature, it is then possible to determine whether and when the HVS temperature exceeds the maximum HVS operating temperature. In order to correspondingly avert this, the preconditioning mode is then proactively activated.

In a similar manner, a future interior temperature may be predicted and the preconditioning mode is activated only if said future interior temperature exceeds a maximum interior temperature. Thus, advantageously, preconditioning of the high-voltage accumulator takes place only if the air-conditioning unit is also required in the future for cooling the interior. If, by contrast, it is foreseen that the air-conditioning unit is not required for cooling the interior, no preconditioning needs to take place either since the air-conditioning unit is available in the future with its full cooling potential for cooling the high-voltage accumulator. If the latter then does not need to be cooled in the future, energy which would otherwise have been unnecessarily used for the preconditioning is saved.

Particular advantages also arise from the combination of the predictions of the future HVS temperature and the future interior temperature. By means of these two predictions, it is then possible in particular to divide the available cooling potential of the air-conditioning unit optimally between the current and future cooling need of the interior and of the high-voltage accumulator. The high-voltage accumulator is then suitably preconditioned at least in those cases in which there is simultaneously a future cooling need of the high-voltage accumulator and of the interior and the sum total thereof exceeds the cooling potential of the air-conditioning unit. By means of the preconditioning, in the anticipated case of the cooling potential being exceeded by the joint cooling need, the entire cooling potential is then available for air-conditioning the interior while the high-voltage accumulator does not need to be cooled because of the cold buffer produced by means of the preconditioning.

The future interior temperature and the future HVS temperature are generally in each case also referred to as the future temperature. Temperature is then understood in particular as also meaning a plurality of temperature values which form a time temperature profile. At least a future temperature is preferably predicted as a future temperature profile, specifically for a period of time of at least 10 and at most 45 minutes. This period of time corresponds in particular approximately to the thermal inertia of the high-voltage accumulator and of the interior. In order to be able to react in a suitable manner to a corresponding future cooling requirement, a prompt reaction is made possible by the appropriate choice of the period of time of the prediction.

Preferably, at least a future temperature is predicted by vehicle data being evaluated by means of a control unit. As a result, a particularly precise prediction of the respective future temperature or of the temperature profile is ensured. In particular, corresponding sensors which are connected to the control unit for the purpose of evaluation are arranged on the vehicle in order to detect the vehicle data. The sensor data supplied by said sensors, that is to say vehicle data, then serve in particular as the basis for the prediction of the temperature development in the interior and/or at the high-voltage accumulator.

The vehicle data may be selected from a quantity of vehicle data, including the current HVS temperature, the current interior temperature, and a current or future HVS requirement profile of the high-voltage accumulator. The current temperatures serve here preferably in combination with an associated preceding temperature profile in particular as starting points of the prediction. On the basis of this known temperature profile, the future temperature is then in particular determined and correspondingly deduced.

Since in particular charging and discharging operations at the high-voltage accumulator are responsible for a temperature change at the latter, the HVS requirement profile is expediently also used for predicting the HVS temperature. The HVS requirement profile is understood in particular as meaning the time profile of the extraction of energy from, and of the input of energy into, the high-voltage accumulator. The current HVS requirement profile includes in particular also the corresponding preceding requirements, that is to say past requirements, and is therefore suitable particularly for predicating the future HVS temperature since the high-voltage accumulator is correspondingly heated up customarily with a time delay depending on the HVS requirement profile because of the thermal inertia.

Alternatively or in addition, the vehicle data suitably include at least one environmental parameter of the vehicle, for example the outside temperature, the time of day or the solar insolation. This environmental parameter can be used in particular to predict a future cooling requirement profile at the interior, i.e. the future interior temperature. For example, in the event of powerful solar insolation, the starting point is future heating up of the interior and correspondingly a rise in the interior temperature and a possibly associated cooling need. A cooling need at the high-voltage accumulator or in the interior can advantageously also be predicted in each case by detection of the outside temperature and in particular comparison of the latter with the HVS operating temperature and the feel-good temperature.

A particularly suitable source for vehicle data is in particular a navigation system installed in the vehicle. The vehicle data may be therefore preferably data of such a navigation system, for example the position of the vehicle, the travel time which is predicted for a certain distance by the navigation system, the speed profile of the vehicle, the type of road and the height profile of the distance. On the basis of these data, a particularly specific and meaningful prediction of the interior temperature and/or of the HVS temperature is possible. An HVS requirement profile can in particular also be deduced therefrom.

If, for example, it is known from the navigation system that the vehicle is traveling over a certain part of the designated route by motorway, then, in contrast to town travel, an increased extraction of energy from the high-voltage accumulator is anticipated and, accordingly, an increased cooling need. In another example, with numerous variations in the height profile of the designated route, a particularly large number of charging and discharging operations of the high-voltage accumulator can be anticipated, as a result of which, in turn, a correspondingly high thermal loading arises.

The position of the vehicle also permits conclusions in particular regarding the cooling need in the interior. For example, it is assumed that, in the event of travel through a tunnel, there is an at most low cooling requirement in respect of the interior, but this possibly rises upon leaving the tunnel. The travel time foreseeably still remaining is also used for the prediction, for example, in such a manner that, if the end of the trip is soon, the entire cooling potential is useable for cooling the high-voltage accumulator since cooling of the interior is no longer required at the end of the trip.

Since the high-voltage accumulator customarily also has a minimum HVS operating temperature, below which the temperature should not fall in order to avoid permanent damage, the high-voltage accumulator is cooled in the preconditioning mode by means of the air-conditioning unit preferably at maximum for as long as the current HVS temperature is greater than the minimum HVS operating temperature. As a result, the high-voltage accumulator is supercooled, in particular only down to the minimum HVS operating temperature, in order to continue to ensure operation of the high-voltage accumulator within an optimum operating temperature range.

The cooling potential of the air-conditioning unit is possibly also dependent on various parameters, in particular the abovementioned environmental parameters, such as, for example, the outside temperature, a maximally desired or permissible operating volume or an incident flow speed of a cooling module of the air-conditioning system. Under some circumstances, because of this dependency, a corresponding variation of the cooling potential available at a certain point then arises. For example, in the case of warm weather, the cooling potential is reduced since, in comparison to operation in cold weather, heat can only be removed to a reduced extent to the environment via the cooling module. The cooling potential may therefore be determined depending on a parameter which is selected from a quantity of parameters including an outside temperature, a maximum operating volume and an incident flow speed. This is preferably also understood as meaning that the cooling potential is predicated, that is to say a cooling potential available in the future is determined on the basis of the parameter and is used for predicting a future cooling conflict. The preconditioning mode is then activated in particular depending on the predicted cooling potential.

Other objects, advantages and novel features of the inventive method and system will become apparent from the following detailed description of one or more preferred embodiments when considered in conjunction with the accompanying drawings, in which:

DETAILED DESCRIPTION OF THE DRAWINGS

Figure 1:
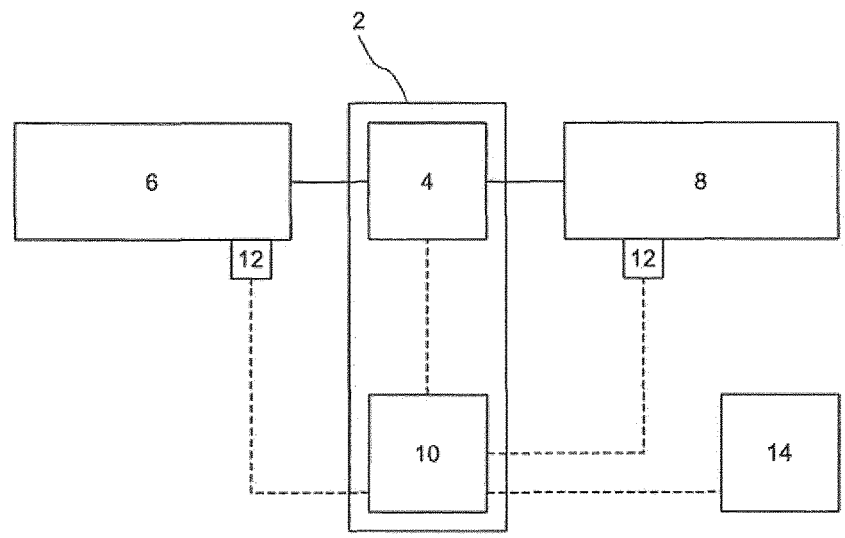
FIG. 1 is a simplified block diagram of an air-conditioning system.

FIG. 1 illustrates an air-conditioning system 2 schematically as a block diagram. The air-conditioning system 2 has an air-conditioning unit 4 which serves for air-conditioning both a high-voltage accumulator 6 and an interior 8 of an electric or hybrid vehicle (not shown specifically). The air-conditioning system 2 furthermore has a control unit 10 which is connected to diverse components via control and signal lines, which are illustrated as dashed lines. The control unit 10 thus controls the air-conditioning unit 4 and is furthermore connected to sensors 12 in the interior 8 and on the high-voltage accumulator 6 and to a navigation system 14 in order to determine vehicle data.

Figure 2:
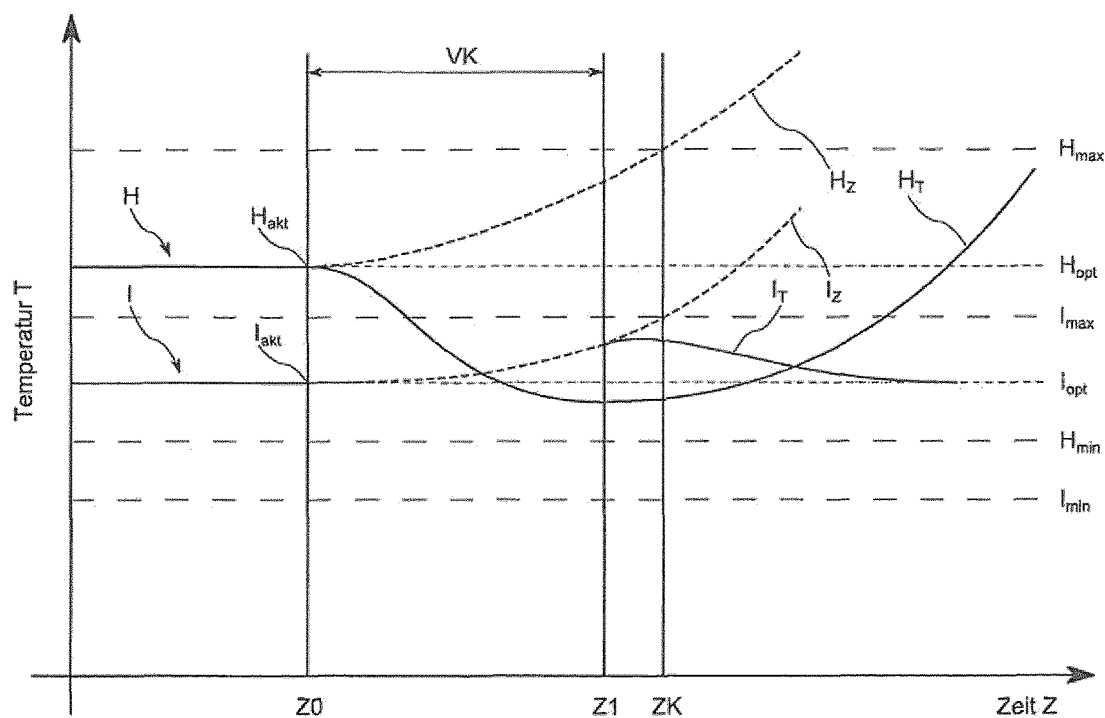
FIG. 2 are the temperature profiles at the high-voltage accumulator and in the interior of an electric vehicle.

To explain a method for air-conditioning an electric or hybrid vehicle, in particular by means of the air-conditioning system 2, FIG. 2 shows a graph in which profiles of the temperature T at the high-voltage accumulator 6 and in the interior 8 of the vehicle are illustrated as HVS temperature H and interior temperature I in relation to the time Z. The time Z0 marks the present time, up to which the HVS temperature H and the interior temperature I have each been adjusted to a predetermined value, namely an HVS operating temperature $H_{opt}$ for the high-voltage accumulator 6, for example within a range of 25 to 29° C., and a feel-good temperature $I_{opt}$ for the interior 8, for example approximately 20° C. The HVS operating temperature $H_{opt}$ lies here within a HVS operating temperature interval with a minimum HVS operating temperature $H_{min}$ and a maximum HVS operating temperature $H_{max}$, for example 20 and 40° C., respectively; the feel-good temperature $I_{opt}$ lies between a minimum feel-good temperature $I_{min}$ and a maximum feel-good temperature $I_{max}$, for example 18 and 24° C., respectively. The temperatures H, I of a current HVS temperature $H_{curr}$ and of a current interior temperature $I_{curr}$ then lie correspondingly at the time Z0. A prediction of the HVS temperature HZ and of the interior temperature IZ is undertaken starting from the time Z0.

On the basis of vehicle data, for example data of the navigation system 14, the control unit 10 establishes a prediction of the temperature profiles as future temperature profiles HZ, IZ. In the exemplary embodiment shown here, there is a prediction to the effect that the temperatures H, I would each rise without additional measures. This is possibly the case with a high outside temperature. Without further air-conditioning, starting from the present time Z0, the HVS temperature H and the interior temperature I would then correspondingly rise. These are illustrated in FIG. 2 by the future HVS temperature HZ and the future interior temperature IZ. It becomes clear here that, in the future, there is a cooling need both for the high-voltage accumulator 6 and for the interior 8. In addition, it is predicted that the two future temperature profiles HZ, IZ, because of the rising profile, after a certain time, at a time ZK, will exceed the respective maximum HVS operating temperature $H_{max}$ and the maximum feel-good temperature $I_{max}$. At the latest at this time ZK, there is then an in particular critical cooling requirement both for the high-voltage accumulator 6 and for the interior 8.

However, under some circumstances, the cooling potential of the air-conditioning unit 4 of the vehicle does not suffice to cover the entire cooling need of said two combined requirements. Therefore, in the future, a conflict will probably occur in respect of the distribution of the cooling potential to the interior 8 and the high-voltage accumulator 6. This is recognized by the control unit 10 which activates a preconditioning mode VK following the time Z0. While said preconditioning mode is active, the high-voltage accumulator 6 is supercooled below its HVS operating temperature $H_{opt}$. This is illustrated in FIG. 2 as the actual HVS temperature HT. In the exemplary embodiment shown here, the entire cooling potential of the air-conditioning unit 4 is used first of all for supercooling the high-voltage accumulator 6, and therefore the actual interior temperature IT initially rises as predicted.

The preconditioning mode VK is activated in particular up to a time Z1 from which the cooling potential is used for cooling the interior 8 in order to avoid exceeding the maximum feel-good temperature $I_{max}$. In particular, the originally predicted exceeding of the maximum feel-good temperature $I_{max}$ is prevented at the later time ZK here. In addition, the high-voltage accumulator 6 is at a sufficiently low temperature level so as not to exceed the maximum HVS operating temperature $H_{max}$ despite cooling failing to materialize at the time ZK. The correspondingly required cooling power has already been input as a cold buffer into the high-voltage accumulator 6 in the preconditioning mode VK at a time at which no interior cooling was required.

Alternatively, the high-voltage accumulator 6 may be supercooled down to the minimum operating temperature $H_{min}$, upon the achieving of which the preconditioning mode VK is, however, switched off. Excessive supercooling the high-voltage accumulator 6 is thereby avoided.

LIST OF DESIGNATIONS

2 Air-conditioning system
4 Air-conditioning unit
6 High-voltage accumulator
8 Interior
10 Control unit
12 Sensor
14 Navigation system
I Interior temperature
$I_{curr}$ current interior temperature
IT Actual interior temperature
IZ Future interior temperature
$I_{max}$ Maximum feel-good temperature
$I_{opt}$ Feel-good temperature
$I_{min}$ Minimum feel-good temperature
H HVS temperature
$H_{curr}$ Current HVS temperature
HT Actual HVS temperature
HZ Future HVS temperature
$H_{max}$ Maximum operating temperature
$H_{opt}$ Operating temperature
$H_{min}$ Minimum operating temperature
T Temperature
VK Preconditioning mode
Z0 Present time
Z Time
Z1 Time (end of the preconditioning mode)
ZK Time (of a predicted conflict)

The foregoing disclosure has been set forth merely to illustrate the inventive method and system and is not intended to be limiting. Since modifications of the disclosed embodiments incorporating the spirit and substance of the inventive system and method may occur to persons skilled in the art, the invention should be construed to include everything within the scope of the appended claims and equivalents thereof.

What is claimed is:
1. A method for air conditioning an electric or hybrid vehicle, the method comprising:
 preconditioning a high voltage accumulator of the electric or hybrid vehicle, wherein
  the electric or hybrid vehicle has an interior and the high voltage accumulator is air conditioned with an air-conditioning unit having a determined cooling potential,
  the high voltage accumulator has a current HVS temperature,
  the interior has a current interior temperature,
  during the preconditioning, the high voltage accumulator is supercooled in a preconditioning mode with the air-conditioning unit to an HVS temperature that is below an HVS operating temperature, and the preconditioning takes place at an earlier time than a time at which the high voltage accumulator is used.

2. The method as claimed in claim 1, wherein the preconditioning mode is activated depending on a cooling requirement profile for the interior, and depending on a cooling requirement profile for the high voltage accumulator.

3. The method as claimed in claim 2, wherein in the preconditioning mode the high voltage accumulator is supercooled as long as the cooling potential is at most partially used for cooling the interior.

4. The method as claimed in claim 3, wherein a future HVS temperature is predicted and the preconditioning mode is activated if said future HVS temperature exceeds a maximum HVS operating temperature.

5. The method as claimed in claim 4, wherein a future interior temperature is predicted and the preconditioning mode is activated only if said future interior temperature exceeds a maximum interior temperature.

6. The method as claimed in claim 4, wherein the future temperature is predicted as a future temperature profile for a period of time of at least 10 and at most 45 minutes.

7. The method as claimed in claim 6, wherein at least a future temperature is predicted by vehicle data being evaluated by means of a control unit.

8. The method as claimed in claim 7, wherein the vehicle data are selected from a quantity of vehicle data, comprising the current HVS temperature, the current interior temperature, and a current or future HVS requirement profile of the high voltage accumulator.

9. The method as claimed in claim 8, wherein the vehicle data comprise at least one environmental parameter of the vehicle.

10. The method as claimed in claim 8, wherein the vehicle data are data of a navigation system of the vehicle.

11. The method as claimed in claim 10, wherein, in the preconditioning mode, the high voltage accumulator is cooled by means of the air-conditioning unit as long as the current HVS temperature is greater than a minimum HVS operating temperature.

12. The method as claimed in claim 11, wherein the cooling potential is determined depending on a parameter which is selected from a quantity of parameters comprising: an environment parameter of the vehicle, an outside temperature, a maximum operating volume and an incident flow speed.

13. An air conditioning system for air conditioning an electric or hybrid vehicle which has an interior, the air conditioning system comprising:
    a high voltage accumulator;
    an air conditioning unit; and
    a control unit, wherein
        the air conditioning unit air conditions both the interior and also the high voltage accumulator,
        the control unit when required switches the air-conditioning unit into a preconditioning mode in which, for the preconditioning of the high voltage accumulator, the high voltage accumulator is supercooled by means of the air conditioning unit to an HVS temperature below an HVS operating temperature, and
        the preconditioning takes place at an earlier time than a time at which the high voltage accumulator is used.

14. The method as claimed in claim 1, wherein the preconditioning mode creates a cold temperature buffer which delays a time of a cooling requirement at the high voltage accumulator.

15. The system as claimed in claim 13, wherein the preconditioning mode creates a cold temperature buffer which delays a time of a cooling requirement at the high voltage accumulator.

* * * * *